United States Patent [19]
Esnouf

[11] Patent Number: 5,364,108
[45] Date of Patent: Nov. 15, 1994

[54] GAME APPARATUS

[76] Inventor: Philip S. Esnouf, 78 Power Street, Hawthorn, Victoria, 3211, Australia

[21] Appl. No.: 46,867

[22] Filed: Apr. 8, 1993

[30] Foreign Application Priority Data

Apr. 10, 1992 [AU] Australia .................. 1842/92

[51] Int. Cl.⁵ .................. A63F 9/22; G09B 7/02
[52] U.S. Cl. .................. 273/430; 273/432; 273/436; 434/323; 434/351; 434/352
[58] Field of Search .......... 273/429, 430, 431, 432, 273/433, 434, 435, 436; 434/322, 323, 350, 351, 352

[56] References Cited

U.S. PATENT DOCUMENTS 3,763,577 10/1973 Goodson .................. 434/352
4,372,554 2/1983 Orenstein .................. 273/430
5,092,779 3/1992 Piwonka et al. .................. 434/352

Primary Examiner—William H. Grieb
Attorney, Agent, or Firm—Nixon & Vanderhye

[57] ABSTRACT

A video game apparatus is provided for use in conjunction with a remotely controllable audio visual playback device, such as a video cassette player. The game apparatus comprises a learning remote control which is programmed with remote control signals such as pause and restart signals for the particular audio visual playback device with which it is to be used. A plurality of hand-held switches are coupled to the remote control so that when one of the switches is actuated the audio visual playback is paused. In this way, a plurality of players may play a prerecorded question and answer type quiz game, wherein the first player to actuate his or her hand-held switch is allowed time to answer the preceding question whilst the audio visual playback is paused.

22 Claims, 11 Drawing Sheets

GAME APPARATUS

BACKGROUND OF THE INVENTION

The present invention relates to a game apparatus, and in particular to apparatus which may be used in conjunction with a video and/or audio playback device and/or a video display device which has at least one function which is controllable remotely from the device.

SUMMARY OF THE INVENTION

According to a first aspect of the invention there is provided a game apparatus for use with video and/or audio reproduction apparatus having at least one function of video or audio reproduction which is controllable remotely by way of remote control signals, said game apparatus comprising control means for issuing a first said remote control signal and a plurality of switch means coupled to said control means by way of selection means, wherein when one of said switch means is actuated said selection means causes said control means to issue said first remote control signal, and thereafter said selection means prevents the actuation of any of said switch means from causing the issuance of a said remote control signal until said game apparatus has been reset.

According to a second aspect of the invention there is provided a video game apparatus for use with a video playback device capable of supplying prerecorded visual information to a video display device for display thereon, said video playback device having at least a pause function controllable remotely by way of remote signals, said video game apparatus comprising remote control means for issuing a first said remote signal and a plurality of switch means coupled to said remote control means by way of selection means, wherein when one of said switch means is actuated said selection means causes said remote control means to issue said first remote signal, and thereafter said selection means prevents the actuation of any of said switch means from causing the issuance of a said remote signal until said apparatus has been reset.

Preferably the format of said remote signals is obtained from a remote control device which may be used to control the video playback device during normal operation, the format of said remote signals being obtained by the remote control means of the video game apparatus by receiving and demodulating the remote signals from the remote control device, whereby said video game apparatus may be adapted to operate with a different video playback device by obtaining and storing the remote signals of a remote control device corresponding to said different playback device.

Preferably said apparatus is reset by way of a reset switch operable by a user of the game apparatus. Said apparatus may also be reset by timer means provided in the apparatus and by means responsive to signals issued, in use, by said video playback device.

Preferably said video playback device or said video display device includes audio reproduction means, said apparatus further comprising a means responsive to an audio signal issued by said audio reproduction means to cause said remote control means to issue said remote signals.

Preferably also the operation of resetting said apparatus either causes said remote control means to issue said remote signals or causes said remote control means to issue second remote signals.

Preferably when said video playback device receives said remote signals the supply of said pre-recorded information is paused, and if the supply of said video information by said video playback device is paused, the receipt of said remote signals by said video playback device causes the video playback device to recommence said supply. Receipt by said video playback device of said second remote signals preferably also causes said video playback device to recommence supply of said video information if said supply was paused by the earlier issuance of said remote signals.

In accordance with the present invention there is also provided a video game apparatus for use with a video playback device capable of supplying pre-recorded visual and audio information to a video and audio reproduction means, said video playback device having a plurality of functions which are controllable remotely by a plurality of infrared control signals, said game apparatus comprising:

control means for issuing at least one of said infrared control signals;

a plurality of switch means which are actuable by users of the apparatus; and a selection means coupled between the switch means and the control means;

wherein following actuation of one of said plurality of switch means said selection means causes said control means to issue a said infrared control signal to pause supply of said pre-recorded information and thereafter prevents the actuation of any of said switch means from causing the issuance of a said infrared control signal until said selection means receives a reset signal.

Preferably said video game apparatus includes a medium pre-recorded with video and audio information suitable for reproduction by means of said video playback device, and further includes means responsive to visual and/or audio signals reproduced from said pre-recorded video and audio information to cause said control means to a said infrared control signal.

According to the present invention there is further provided a video game apparatus for use with an audio visual reproduction means having a plurality of functions which are controllable remotely by a plurality of remote control signals, the game apparatus comprising:

a control means for issuing said remote control signals;

a plurality of switch means actuable by users of the apparatus to output a first control signal to the control means;

a reset switch actuable to output a second control signal to the control means; and means responsive to a visual or auditory signal from the audiovisual reproduction means to output a third control signal to the control means; wherein the control means is responsive to the first and/or third control signals to issue a first remote control signal operative to cause the audio visual reproduction means to pause reproduction of audio and/or visual information and responsive to the second and/or third control signals to issue a second remote control signal operative to cause the audiovisual reproduction means to recommence reproduction of the audio and/or visual information.

The apparatus of the invention may be used, for example, in conjunction with a video cassette or video disk player provided with prerecorded audiovisual material such as a prerecorded question and answer type quiz. A plurality of players, each provided with one of the switch means, view or listen to a question and when a player actuates his or her switch means or the end of the question is reached audio and/or visual reproduction of the prerecorded material is paused to allow a player time to answer the question. Actuation of a manual reset or reception of an auditory or visual signal from the prerecorded material can then be utilised to trigger recommencement of the audio and/or visual reproduction so the players may view or listen to the answer to the preceding question. The game apparatus may advantageously take advantage of circuitry resembling a "learning remote control" in which, for example, infrared remote control signals for different VCRs can be stored so that the game apparatus can be adapted to operate with a variety of remotely controllable audio visual reproduction devices by "learning" the relevant remote control signals such as a "play" signal and a "pause" signal.

BRIEF DESCRIPTION OF THE DRAWINGS

The present invention is described in greater detail hereinafter, by way of example only, with reference to the accompanying drawings, wherein.

DETAILED DESCRIPTION OF THE PREFERRED EMBODIMENTS

Figure 1:
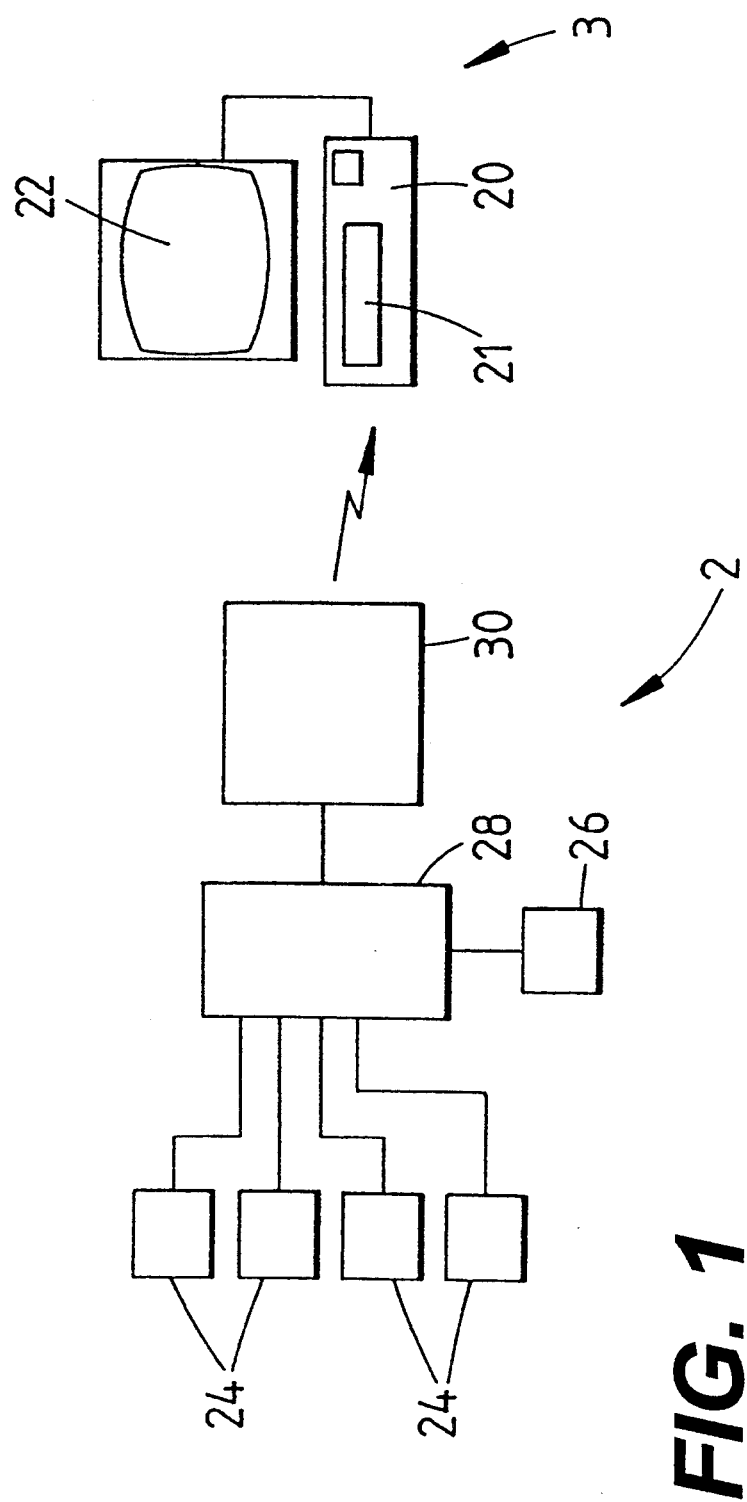
FIG. 1 is a block diagram of apparatus according to a first embodiment of the invention.

In FIG. 1 there is shown a block diagram of a game apparatus 2 which is used in conjunction with a television 22 which is coupled to a video cassette recorder/player (VCR) 20. A pre-recorded video cassette indicated by reference numeral 21 is loaded on the VCR 20 to enable playback of its pre-recorded display by way of the television 22. The VCR 20 is of the type which is remotely controllable by way of a wireless remote control, such as, for example, by way of infrared signals. At least the functions which pause playback of the pre-recorded video cassette 21, and restarts playback of the cassette 21 when paused, are available to be controlled by remote control.

The video cassette 21 is pre-recorded, for example, with a series of questions such as in a format which is popular on television quiz game shows. Each pre-recorded question on the video cassette 21 is followed by a pre-recorded answer to the immediately preceding question. The format of the questions and answers which are recorded on the video cassette 21 may be presented in the form of a game show host who reads the question and answer, or may be presented in a variety of different formats. Similarly, the question and answer may be presented by way of the audio output of the television 22, whilst some visual presentation is displayed on the screen thereof, or the question and answer may be, for example, presented by way of test or otherwise presented on the visual output of the television 22.

The form of the game to which the game apparatus 2 is directed is such that a plurality of players may compete against each other to answer correctly the questions which are presented on the television 22 by way of the VCR 20 playing the pre-recorded video cassette 21. In it simplest preferred form, the game apparatus 2 comprises a plurality of player inputs 24 which are coupled into selection circuitry 28. Also coupled to the selection circuitry 28 is a reset input 26. The selection circuitry 28 has an output which is coupled to output circuitry 30. The output circuitry 30 is capable of issuing remote control signals to the VCR 20 which are able to pause and restart playback of the video cassette 21, in use. The selection circuitry 28 is circuitry which receives input from each of the player inputs 24. The player inputs 24 may be any type of switching device which, when switched, is detectable by the selection circuitry 28. The selection circuitry 28 is arranged such that when one of the player inputs 24 is switched so as to be detected by the selection circuitry 28, a signal is issued from the selection circuitry to the output circuitry 30. Following actuation of one of the player inputs 24, all subsequent inputs received from any of the player inputs 24 are disregarded by the selection circuitry 28 until actuation of the reset input 26. Upon issuance of the signal from the selection circuitry 28 to the output circuitry 30 following actuation of one of the player inputs 24, the output circuitry 30 acts to issue a remote control pause signal to the VCR 20, thus causing the playback of video cassette 21 to pause. The reset input 26 may comprise a switching means of the same type as the player inputs 24, such that actuation of the reset input 26 is detectable by the selection circuitry. When actuation of the reset input 26 is detected by the selection circuitry 28, an output signal is also issued to the output circuitry 30, which causes the output circuitry 30 to issue a remote control restart signal to the VCR 20. Depending upon the configuration of the particular VCR 20, the remote control pause signal and the remote control restart signal may in fact comprise the same signal, or may be different signals. In the case that the pause and restart signals required by the VCR 20 are the same, the output signal issued from the selection circuitry 28 to the output circuitry 30 in the case of actuation of one of the player inputs 24 and in the case of actuation of the reset input 26 may be the same. Once the remote control restart signal has been issued by the output circuitry 30 following actuation of the reset input 26, the reset input 26 causes the selection circuitry to once again recognise input from the player inputs 24.

In use of the game apparatus 2 to play a game in conjunction with the video playback apparatus 3, playback of the pre-recorded video cassette 21 is first initiated on the VCR 20, such that a pre-recorded quiz question is played on the television 22. Each of the players of the game are in control of a respective player input 24, whereby a player may actuate his input 24 if he believes he knows the answer to the question. When one of the players actuates his player input 24 in this manner, the selection circuitry 28 causes the output circuitry 30 to issue a remote control pause signal to the VCR 20 in the fashion described above. The player who actuated his input 24 is then given an opportunity to answer the immediately preceding question whilst playback of the video cassette 21 is paused. Following the player giving his answer to the question the reset input 26 is actuated which causes playback of the video cassette 21 to recommence. In accordance with the format of the video cassette 21, the correct answer to the immediately preceding question is then played on the television 22, whereby the players of the game may determine whether the particular player who answered the question was correct in his answer. The next question on the video cassette 21 is then played and the game continues in like manner.

Figure 2:
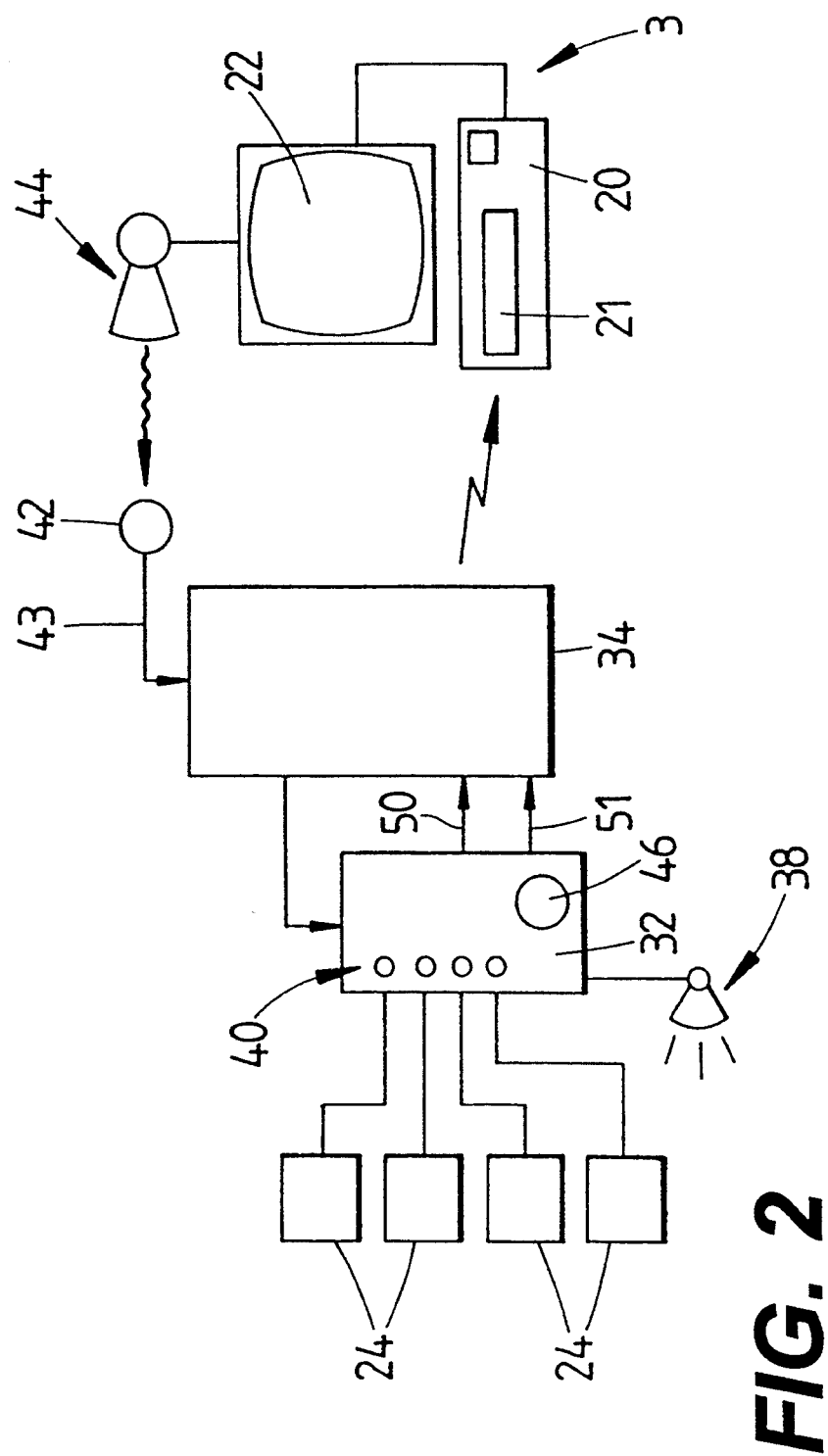
FIG. 2 is a block diagram of apparatus according to a second embodiment of the invention.

FIG. 2 shows a second embodiment of the game apparatus 2, although the operation of the game, in use, is much the same as that described in relation to FIG. 1. In essence, a question is played from the pre-recorded video cassette 21 by way of the video playback apparatus 3, and one of the players of the game actuates his respective player input 24. The actuated player input 24 causes selection circuitry 32 to issue an output signal to control circuitry 34, which acts to issue a remote control pause signal to the VCR 20, so as to pause playback of the video cassette 21. In this embodiment, however, the selection circuitry 32 includes an output for a buzzer 38, such that when any one of the player inputs 24 are actuated, the buzzer 38 is caused to issue an auditory signal indicating the actuation of a player input 24. The selection circuitry 32 further includes an indicator lamp 40 corresponding to each of the player inputs 24. The first of the player inputs to be actuated causes the corresponding indicator lamp 40 to illuminate, thus providing the players with an indication of which of them was the first to actuate his input, and is therefore entitled to answer the question presented by the video playback apparatus 3. The reset input 46 resets the selection circuitry 32 to enable the selection circuitry 32 to again be responsive to the player inputs 24, and returns all of the indicator lamps 40 to their non-illuminated condition. Two output lines 50 and 51 and provided from the selection circuitry 32 to the control circuitry 34, to accommodate the possibility that the remote control pause signal required by the VCR 20 differs from the remote control recommence signal which is required to restart playback of the video cassette 21 after having been paused. Therefore, an output signal issued from the selection circuitry 32 to the control circuitry 34 by way of line 50 causes the control circuitry 34 to issue a first remote control signal which is necessary to pause the VCR 20, whilst a signal issued on line 51 causes the control circuitry 34 to issue a second remote control signal to the VCR 20 to recommence playback of the video cassette 21. In many cases, as mentioned, the pause and restart signals required by the VCR 20 may be the same, in which case the first and second remote control signals issued by the control circuitry 34 would be identical.

In the video playback apparatus 3 indicated in FIG. 2, there is also shown an auditory output, or speaker 44, which provides auditory output from the television 22 or VCR 20. As well as providing auditory information to the players of the game, the speaker 44 may also issue control signals to the game apparatus 2. For this purpose, a microphone 42 is provided which is coupled to the control circuitry 34 by way of input line 43. The pre-recorded video cassette 21 may be provided with pre-recorded auditory control tones at specified intervals through the pre-recorded information, which control tones, when replayed, may be received by microphone 42 and recognised by the control circuitry 34. For example, a control tone may be provided on the pre-recorded video cassette 21 following each presented answer to a question on the cassette 21. The control tone replayed via the speaker 44 and received by the microphone 42 may therefore be recognised by the control circuitry 34, which may then issue a remote control pause signal to the VCR 20 and an output signal to the selection circuitry 32 by way of a microphone reset line 41. The microphone reset line 41 is coupled to the selection circuitry 32 in the same manner as the reset input 46, causing the indicator lamps 40 and player inputs 24 to be reset. The provision of such auditory signals on the cassette 21, and the recognition ability of the control circuitry 34 enabling resetting of the selection circuitry 32 and the ability to pause the VCR 20, provides the players of the game with an opportunity to adjust player scores, and facilitates synchronisation of the game apparatus 2 with the video playback apparatus 3.

Figure 3:
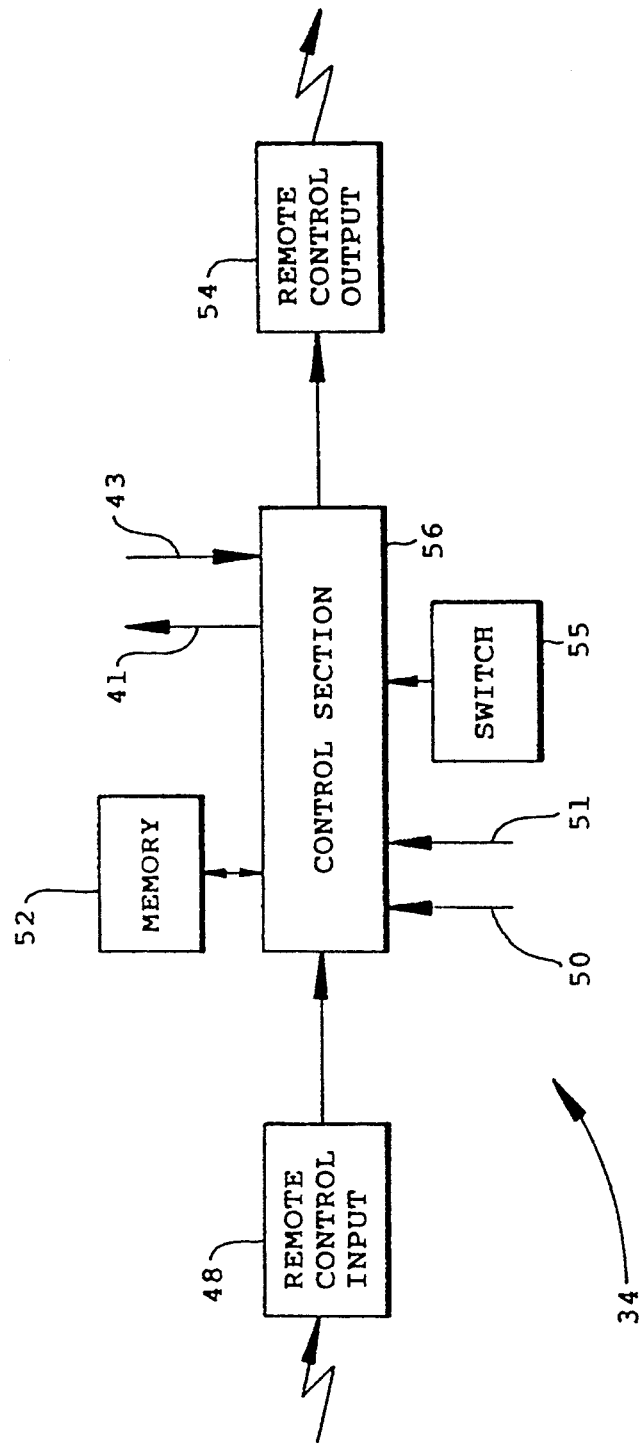
FIG. 3 is a block diagram illustrating the constituents of the control circuitry of the embodiment illustrated in FIG. 2.

FIG. 3 is a more detailed block diagram of the control circuitry 34 utilised in the game apparatus 2 illustrated in FIG. 2. The control circuitry 34 comprises a central control section 56 which receives selector inputs 50 and 51 from the selection circuitry 32, and an auditory control signal input from microphone input line 43. The control section 56 also provides a microphone reset output 41 to the selection circuitry, as described in relation to FIG. 2. The control circuitry 34 further comprises a remote control input 48 coupled for input to the control section 56, a remote control output 54 coupled to receive signals from the control section 56, and a program switch 55 which is also coupled for input to the control section 56. Finally, there is provided memory storage 52 which is coupled to the control section 56 so as to enable data to be written to the memory and read from the memory 52 by the control section 56. The provision of the remote control input 48 and the memory storage 52, in particular, allows the game apparatus 2 to be adapted for use with a number of different types of VCR's 20.

It is not unusual for the format of remote control signal required to pause playback of a VCR 20 to vary from one VCR to another, for example between VCR's made by different manufacturers, or between different models of VCR from the same manufacturer. To enable the game apparatus 2 to be used in conjunction with a variety of different VCR's 20, it is advantageous that the game apparatus 2 include provisions for reproducing the remote control signals which are necessary to control different VCR's. Remote control devices, sometimes referred to as learning remote control devices, are known which are capable of emulating control signals of a remote control device which is ordinarily used or supplied with a remotely controllable VCR or other remotely controllable apparatus.

Figure 8:
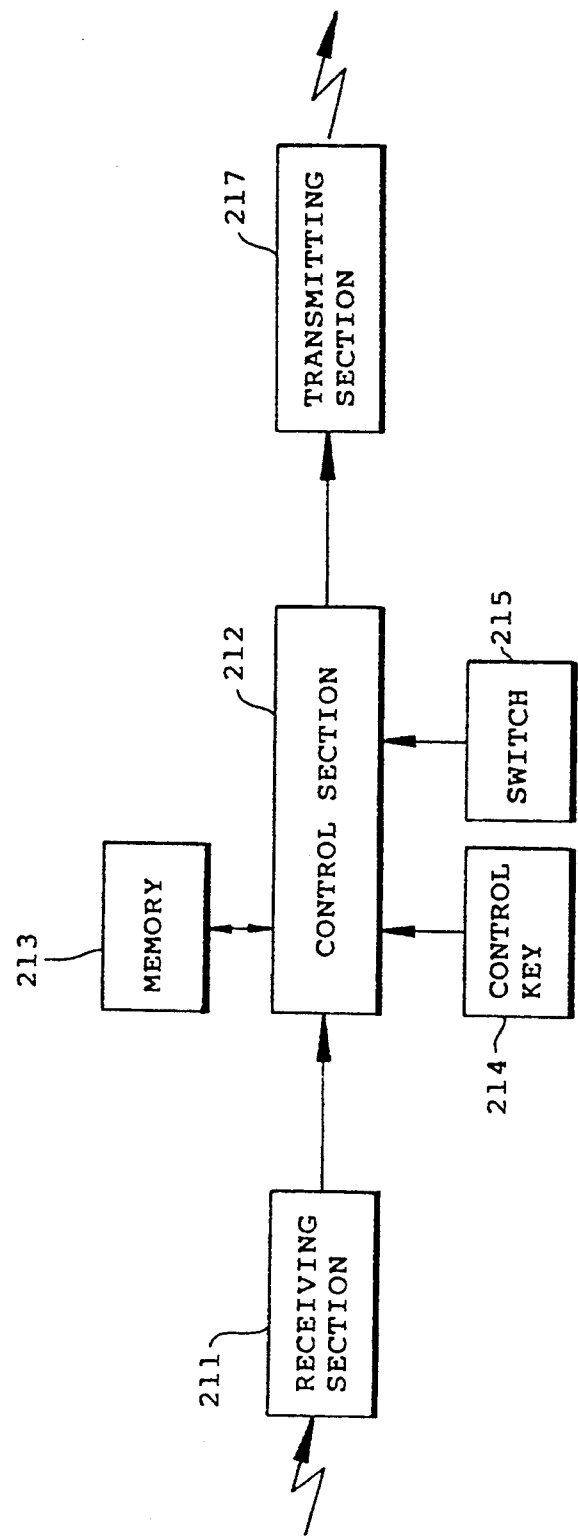
FIG. 8 is a block diagram of a conventional learning remote control device.

FIG. 8 shows a block diagram of a learning remote control device comprising a receiving section 211 which receives a remote control signal transmitted from a conventional non-learning remote control device through the use of infrared rays or the like and performs conversion of the received infrared remote control signal to corresponding electrical signals. A control section 212 is provided which processes the data of the converted electrical signals from the receiving section 211. The learning remote control device further comprises memory storage 213 for storing the data of the received remote control signal; a plurality of control keys 214, each of which may be manipulated to store the data of a remote control signal or to select stored data to transmit a reproduced remote control signal; a switch 215 for shifting the operation mode of the learning remote control device to store data received from the receiving section 211, or transmit stored remote control signals; and a transmitting section 217 which performs a conversion of electrical signals to infrared signals of stored data selected by a control key 214, to reproduce the corresponding remote control signal, and transmit the reproduced remote control signal.

When a remote control signal is transmitted by manipulating the conventional remote control device, the remote control signal is received and demodulated by the receiving section 211 of the learning remote control device, so as to obtain the time data or format of the remote control signal received. The time data or format of the received remote control signal is stored in a reception buffer of the memory 213 by the control section 212. After storing the time data or format of the received remote control signal in the reception buffer, the user remanipulates the same control key of the conventional remote control device so that the remote control signal is again transmitted from the conventional remote control device to be received and demodulated by the receiving section 211. The time data or format of the signal is again obtained, and compared in the control section 12 with that previously stored in the reception buffer. If the stored time data or format and received format are coincident, the combination is stored in a storage region of the memory 213 which corresponds to a particular control key 214. The process of transmitting the same remote control signal twice ensures that the remote control signal has been properly received and demodulated.

When the particular control key 214 is manipulated whilst the operation mode of the learning remote control device is shifted for transmission, the data format is retrieved from the corresponding storage region of the memory 213, and the remote control signal corresponding to the retrieved data is reproduced and transmitted by the transmitting section 217, so as to control the remotely controllable appliance which corresponds to the conventional remote control device in the same manner thereas.

The control circuitry 34 of the game apparatus 2, illustrated in FIGS. 2 and 3, operates in a manner similar to the learning remote control device just described. The program switch 55 has two positions, whereby when the program switch is placed in a program position the control section 56 is receptive to remote control signals received at the remote control input 48, and when the program switch 55 is placed in an operating position the control section 56 is operative to issue remote control signals by way of the remote control output 54.

In order to adapt the game apparatus 2 for use with a particular remotely controllable VCR 20, it is first necessary to place the program switch 55 into the programming position. Having done this, the user then actuates one of the player inputs 24, which causes the selection circuitry 32 to issue a signal to the control section 56 of the control circuitry 34 by way of the selector input 50. Whilst the selector input 50 is activated, the user then places the output port of the remote control device for the VCR 20 adjacent the remote control input 48 of the game apparatus 2 and manipulates the key of the remote control device which corresponds to the pause function of the VCR 20. In accordance with the procedure discussed above, the user then again manipulates the pause key of the remote control device, and if the remote control input 48 has correctly received the pause signal on both occasions then the control section 56 stores data corresponding to the remote control pause signal in a portion of the memory 52 which corresponds to selector input 50. The same procedure is then carried out using the reset input 46 to actuate selector input 51 whilst the restart remote control signal is applied to the remote control input 48. Following completion of the programming procedure the memory 52 contains data stored in a first storage region corresponding selector input 50 which enables the control section 56 and remote control output 54 to reproduce a remote control pause signal, and the memory 52 also contains, in second storage portion corresponding to selector input 51, the data required to reproduce a remote control restart signal.

Figure 5A:
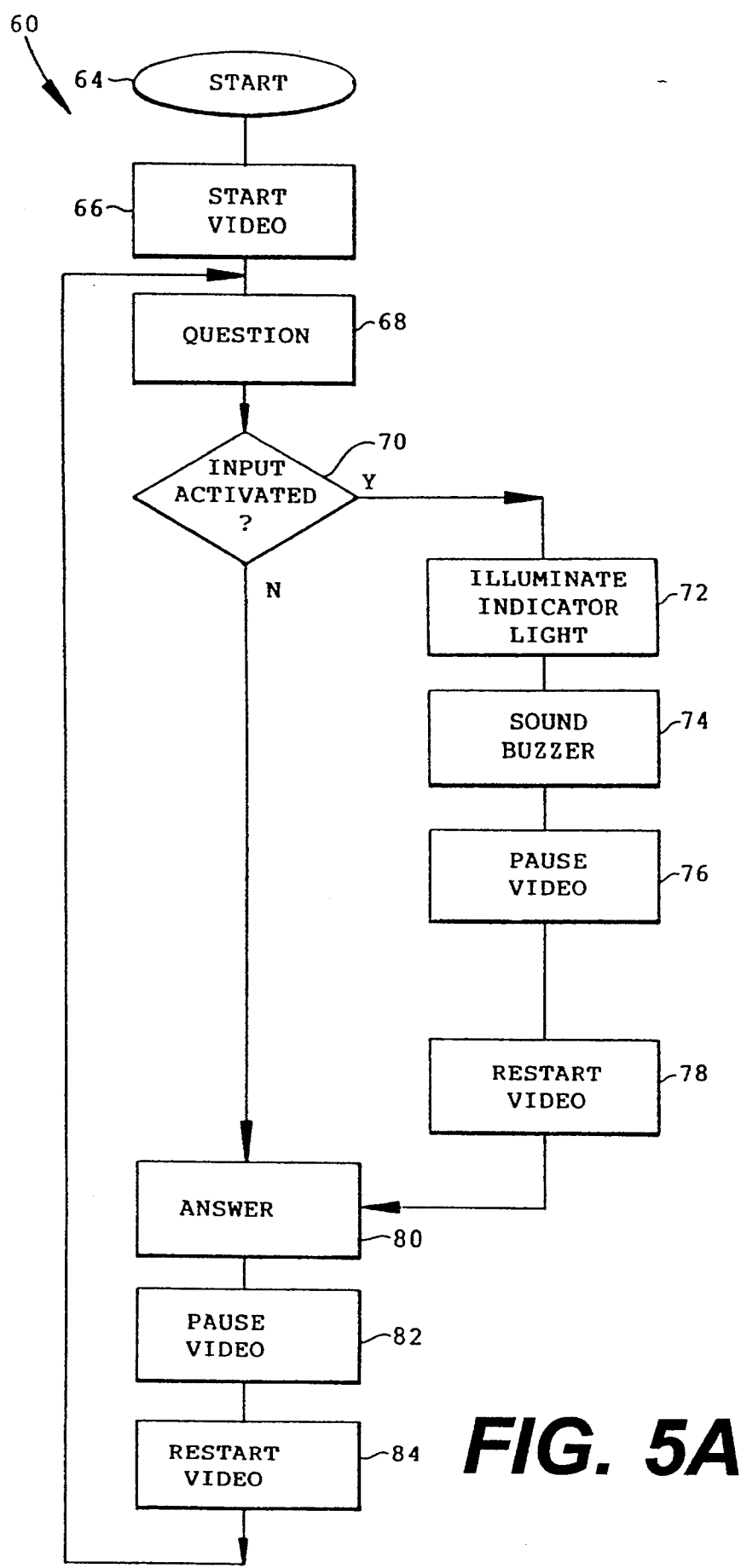
FIG. 5a is a flow chart of operations of the game apparatus during use.
Figure 5B:
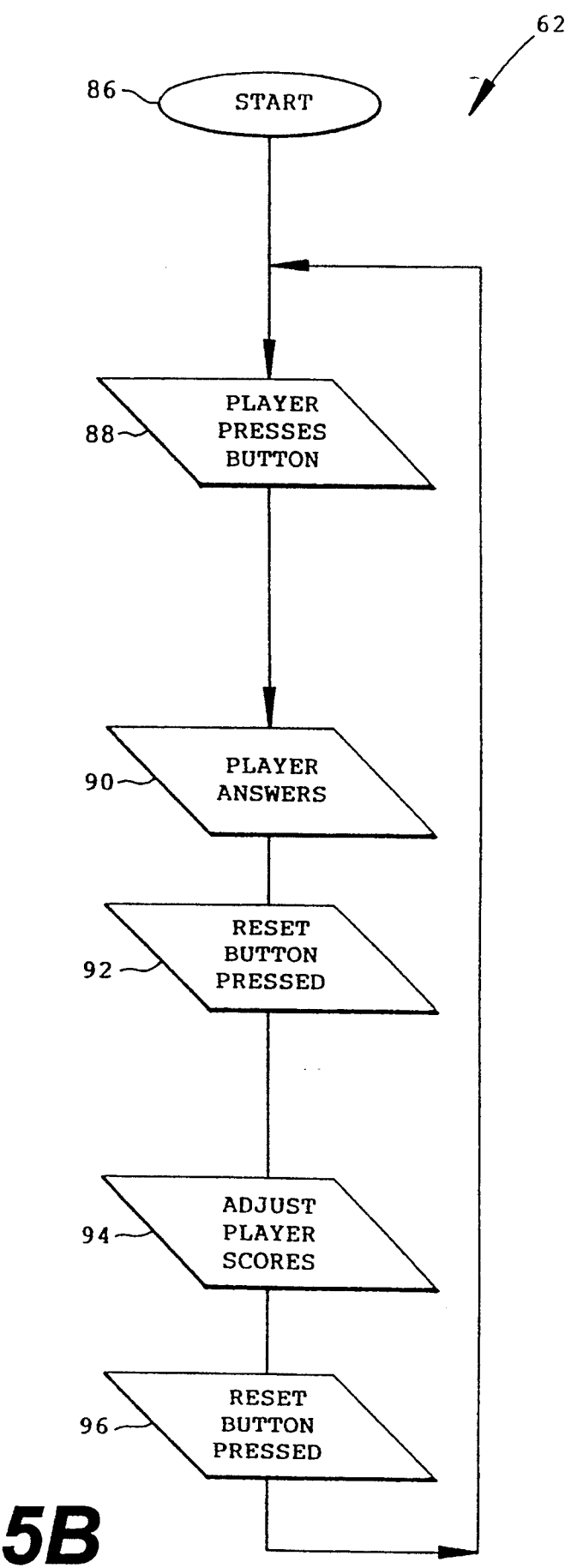
FIG. 5b is a flow chart of operations undertaken by players of the game apparatus during use.

FIG. 5a illustrates a flowchart 60 showing the sequence of operations carried out by the game apparatus 2 and video playback apparatus 3, during use of the game. FIG. 5b shows a flowchart 62 of operations carried out by the players of the game, in a sequence of operations which correspond to the sequence shown in flowchart 60 in FIG. 5a. Examining the flowcharts 60 and 61 simultaneously, following the start of the sequences at steps 64 and 86 respectively, the playback of the video cassette 21 is initiated at step 66. A quiz question is replayed from the video cassette at step 68, and thereafter one or more of the players of the game may actuate their respective player input 24 (step 88). If none of the players actuates a player input 24, then playback of the video cassette 21 continues until the answer to the immediately preceding question is replayed at step 80. Assuming one or more of the players actuates a player input 24, the first of the player inputs actuated registers at step 70 of flowchart 60, which causes the corresponding player indicator lamp 40 to illuminate (step 72) and the buzzer 38 to sound (step 74). Actuation of the player input 24 also causes the control circuitry 34 to issue a remote control pause signal to the VCR 20, which pauses playback of the video cassette 21 (step 76). Whilst the VCR 20 is paused the player whose indicator lamp 40 is illuminated gives his answer to the question put forward at step 68 (see step 90). One of the players then presses the reset input button 46 (step 92) which causes the control circuitry 34 to issue a remote control restart signal to the VCR 20 whereby playback of the video cassette 21 is recommenced at step 78. The answer to the question put forward at step 68 is then played (step 80) from the video cassette 21, to enable the player who gave his answer to the question to determine whether his answer was in fact correct. Following the answer at step 80, the video playback apparatus 3 may thereafter reproduce a control tone recorded on the video cassette 21 which is received by the microphone 42 and detected by the control circuitry 34. This causes the control circuitry 34 to issue a remote control pause signal which pauses playback of the video cassette 21 (step 82). Whilst operation of the VCR 20 is paused, the players may adjust their scores according to the answers given to the immediately preceding question (step 94) and then press the reset input button 46 (step 96) to restart playback of the video cassette 21 (step 84). The next question recorded on the video cassette 21 is then replayed to the game players (step 68) and the game sequence continues as described until the last of the questions in the game has been replayed by the video playback apparatus 3.

Figure 6:
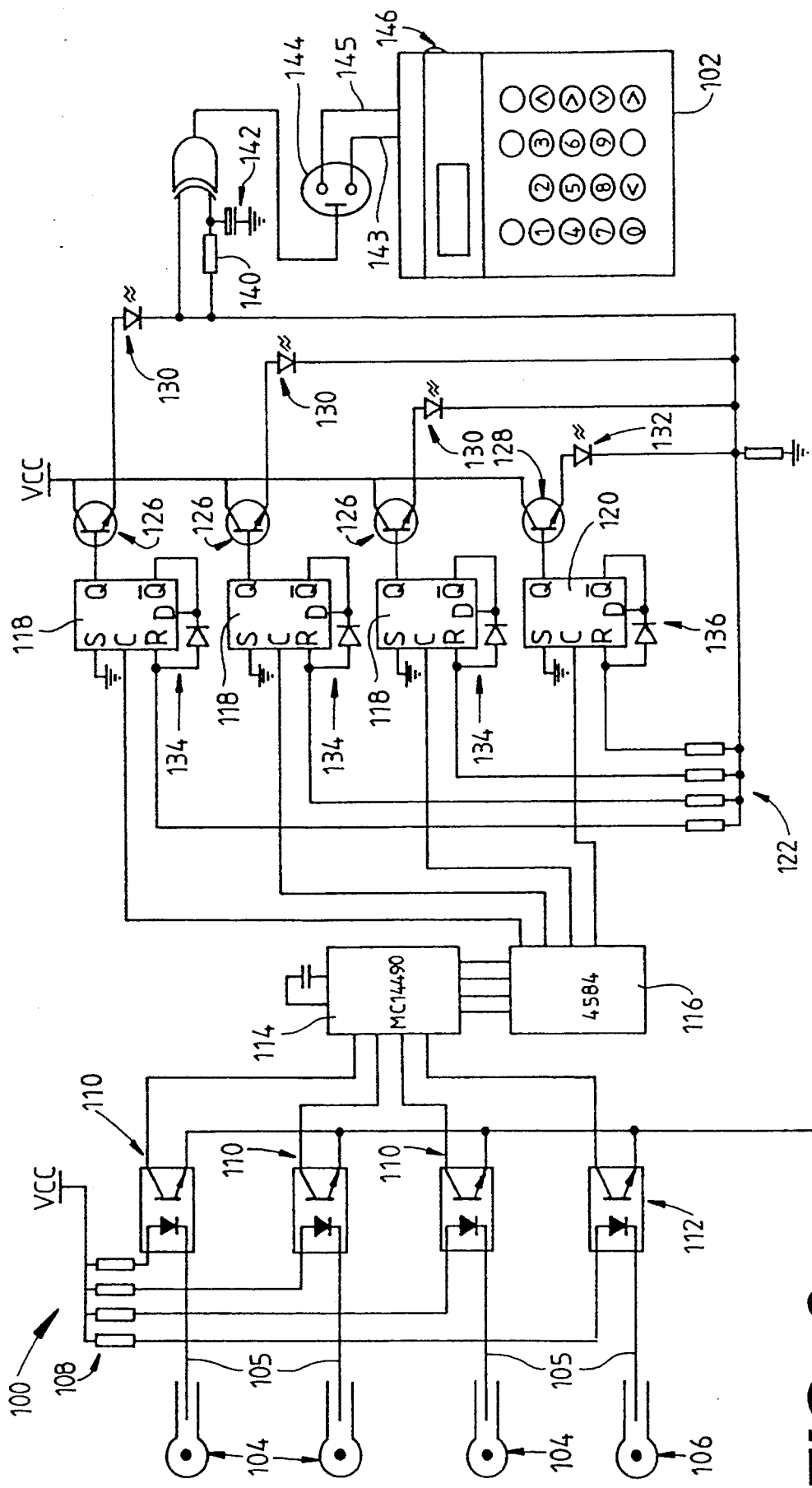
FIG. 6 is a detailed schematic diagram of selection circuitry which may be utilised in the first and second embodiments.

In FIG. 6 there is shown a schematic diagram 100 illustrating, in particular, an example of selection circuitry which may be utilised in the game apparatus 2. On the left hand side of the schematic diagram 100 there are shown player inputs 104, 106 which, when actuated, connect their respective input line 105 to a ground potential. Each player input 104, 106 is coupled to an opto-coupler 110, 112, which is in turn connected to an input of a contact bounce eliminator 114. The outputs of the contact bounce eliminator 114 are connected to respective inputs of a Schmitt trigger 116, which has outputs coupled to the clock inputs of respective flip-flop circuitry 118, 120. Each output Q of the flip-flops 118, 120 is coupled to the base terminal of a respective transistor 126, 128 which control current flow to respective light emitting diodes 130, 132. The cathodes of the light emitting diodes 130, 132 are coupled together, and are coupled directly to one input terminal of an exclusive-OR gate 138, and to the other input terminal of the exclusive-OR gate 138 by way of a resistance/capacitance network comprising a resistor 140 and capacitor 142. The output of the exclusive-OR gate 138 is coupled to the input of an analog switch 144 which, when actuated, connects together terminals coupled to input lines 143 and 145 of a remote control device 102.

In order to examine the operation of the circuit illustrated in schematic diagram 100, it is convenient to follow the sequence of events resulting from actuation of a single player input 106. Actuation of the player input 106 couples the corresponding line 105 to a ground potential, which draws current through resistor 108 and the light emitting diode of opto coupler 112. The light emitted from the light emitting diode in opto-coupler 112 is sensed by the photo-transistor contained in the opto-coupler, which then provides a current path from input terminal 5 of the contact bounce eliminator 114 to ground potential. The contact bounce eliminator 114 reduces or eliminates extraneous level changes which may result from actuation of the switching contact in the player input 106, and outputs a clean switching signal from output terminal 11. The output from the contact bounce eliminator 114 is coupled to input terminal 5 of the Schmitt trigger 116, the output of which is provided at terminal 6. The output terminal 6 of the Schmitt trigger 116 is coupled to the clock input C of the D flip-flop 120. The reset terminal R of the D flip-flop 120 is coupled to ground potential by way of resistors 122 and 124, such that the initial state of the flip-flop 120 is reset whereby output Q is in a logic 0 state and output $\overline{Q}$ is in a logic 1 state. The reset terminal R is also coupled to the anode terminal of a diode 136, the cathode terminal of which is coupled to both the data input D and the complimentary output $\overline{Q}$ of the flip-flop 120. Since the complimentary output $\overline{Q}$ is initially in a logic 1 state, the data input D is also initially in a logic 1 state, whereby when the clock input C is clocked by a pulse from the Schmitt trigger 116 a logic 1 appears at the output Q of the flip flop 120 which is coupled to the base terminal of driving transistor 128. The logic 1 voltage appearing at the base transistor 128 causes current flow from the positive voltage source connected to the collector of the transistor 128, through the transistor and the light emitting diode 132, and through the resistor 124 to ground. The light emitting diode 132 forms the indicator lamp 40 which corresponds to the player input 106, as described in relation to FIG. 2.

The current flow through the transistor 128, the light emitting diode 132 and the resistor 124 raises the potential of the junction between the cathode of the light emitting diode 132 and resistor 124 to a positive level sufficient to cause switching of a logic gate such as the exclusive-OR gate 138 which is connected at that junction. Input terminal 9 of the exclusive-OR gate 138 is connected directly to the junction, whilst input terminal 8 is connected to the junction by way of of a series connected resistor 140 and a capacitor 142 coupled to ground potential at its negative terminal. The RC network constituted by the components 140, 142 causes a delay in transmission of the positive potential from the junction between LED 132 and resistor 124 to the input terminal 8 of exclusive-OR gate 138. During this delay the output of the exclusive-OR gate 138 is logic 1 in accordance with the nature of the exclusive-OR gate, which causes analog switch 144 to connect terminals 143 and 145 of the remote control device 102 during that delay period. It is the connection of terminals 143, 145 which causes the remote control device 102 to issue the prescribed remote control pause signal, thus completing the chain of events described earlier when a player input 24 is activated.

The selection circuit 100 is slightly different in operation to that described in relation to FIGS. 1 and 2, as there is no reset or "recommence" button to restart playback of the VCR 20. Instead the player who actuated his player input in response to the question played by the VCR must again actuate his input to restart playback of the VCR 20 after answering the question. This is a result of the flip-flops 118, 120 being connected with diodes 134, 136 as above described. In the above described example where player input 106 has been actuated, the potential at the reset R inputs of flip-flops 118 raises to a positive voltage by virtue of current flow through LED 132 and resistor 124. This prevents any of inputs 104 from actuating any of the flip-flops 118 since their reset inputs 12 are in a logic one state preventing any clicking by input C. Input 106, on the other hand, is still able to clock flip-flop 120 since the connection of diode 136 retains reset input R at a logic zero level. This further actuation returns the circuit to its initial condition, and in the process causes a pulse output from exclusive-OR gate 138 to restart the VCR 20.

Figure 7:
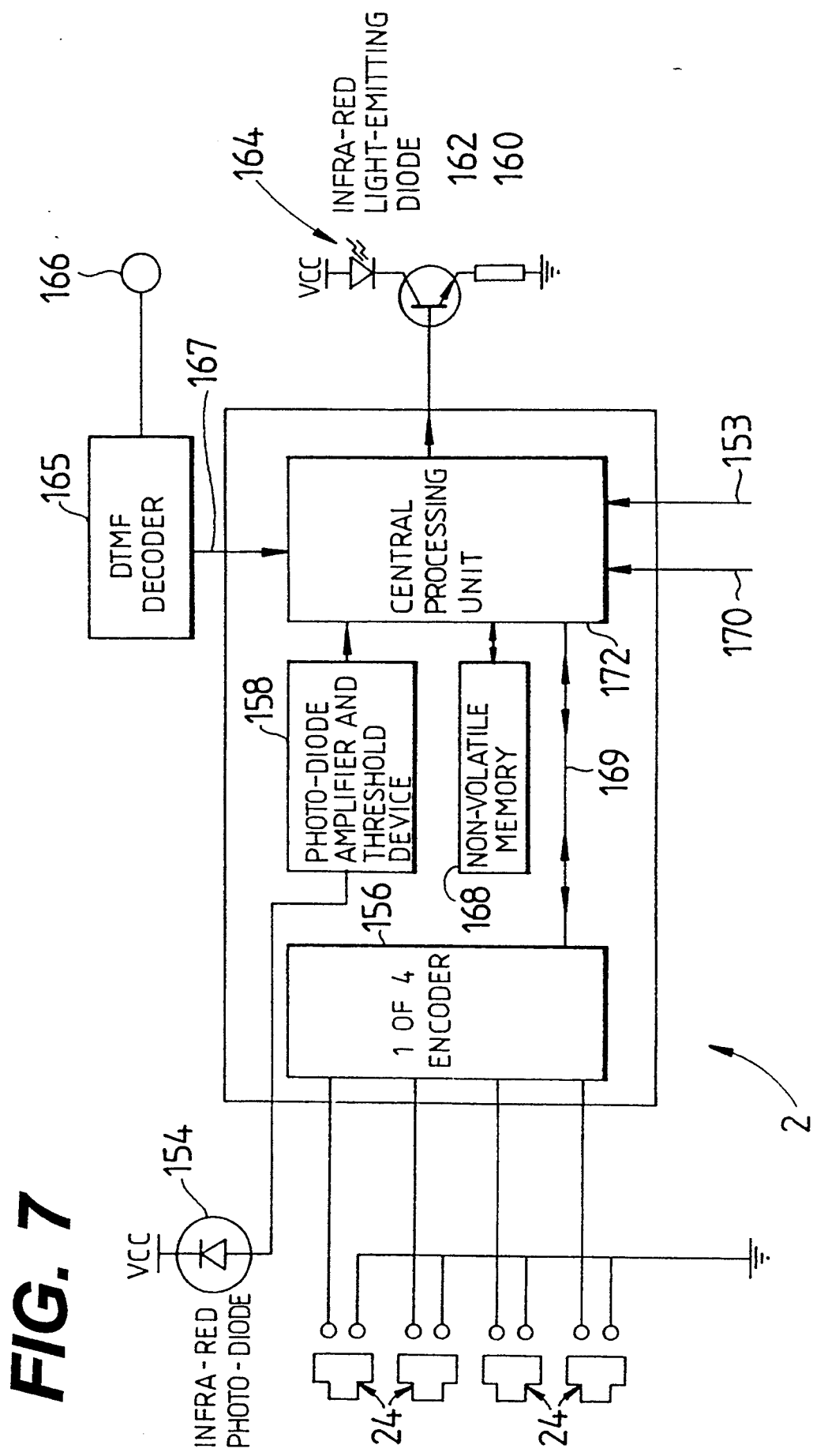
FIG. 7 is a block diagram of a third embodiment of the invention.

FIG. 7 shows an arrangement of a preferred implementation of the game apparatus 2. In this embodiment a selector 156, a photo diode amplifier and threshold device 158, a central processing unit 172, and non-volatile memory storage 168 are interconnected and combined in a single monolithic integrated circuit 152, or may be fabricated as a series of integrated circuits which are interconnected on a single substrate or circuit board 152. An infrared photo-diode 154 is provided as a demodulating means for receiving input from a remote control device for programming of the game apparatus 2, the output of the photo-diode 154 being connected to the input of photo-diode amplifier and threshold device 158. A signal received from the photo-diode 154 is amplified to an appropriate level by the photo-diode amplifier, and then converted to digital signal levels and switching times by the threshold device component of the integer 158. The digital signal is then passed to the central processing unit 172 which, is due course, stores the sequence of pulses which corresponds to the received remote control signal at a predetermined location in the non-volatile memory 168. An infrared light emitting diode 164 is provided as a remote control output device, which is driven by way of a driving transistor 162 having its base terminal connected to an output port of the central processing unit 72, and having a signal path to ground via a current limiting resistor 160. A reset input 170 is provided to the central processing unit 172, as is a selector input 169 which is provided from the selector circuitry 156. A signal path is also provided from the central processing unit 172 to the selection circuitry 156 to enable the selection circuitry to be reset when the reset input 170 is actuated. The selection circuitry 156 also receives input from individual player inputs 24 as hereinbefore described. A program/play switch input 153 is also provided to the central processing unit 172 to select either a program mode wherein remote control signals may be input to the game apparatus 2 by way of the infrared photo diode 154 and stored in memory 168, or a play mode wherein the player inputs 24 and reset input 170 are operable to cause the game apparatus 2 to issue remote control signals by way of the infrared light emitting diode 164. As described in relation to FIG. 2, a microphone input may also be provided, which in this embodiment comprises microphone 166 having a signal output which is coupled to a DTMF decoder 165. When a predetermined tone signal is replayed from the audio cassette 21 and received by the microphone 166, the DTMF decoder 165 recognises the tone and provides an input to the central processing unit 172.

Figure 9:
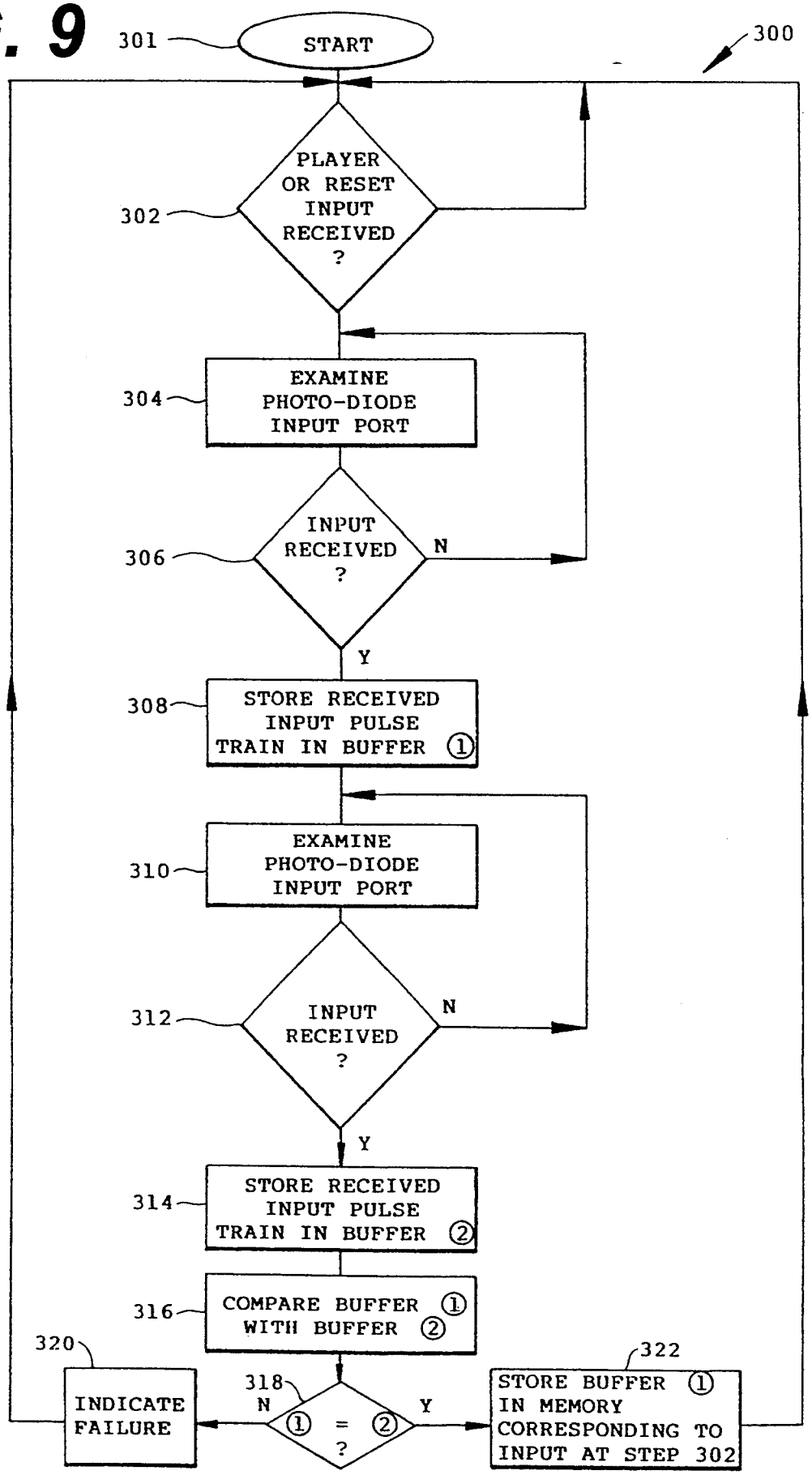
FIG. 9 is a flowchart of operation of the central processing unit of FIG. 7, whilst in a programming mode.
Figure 10:
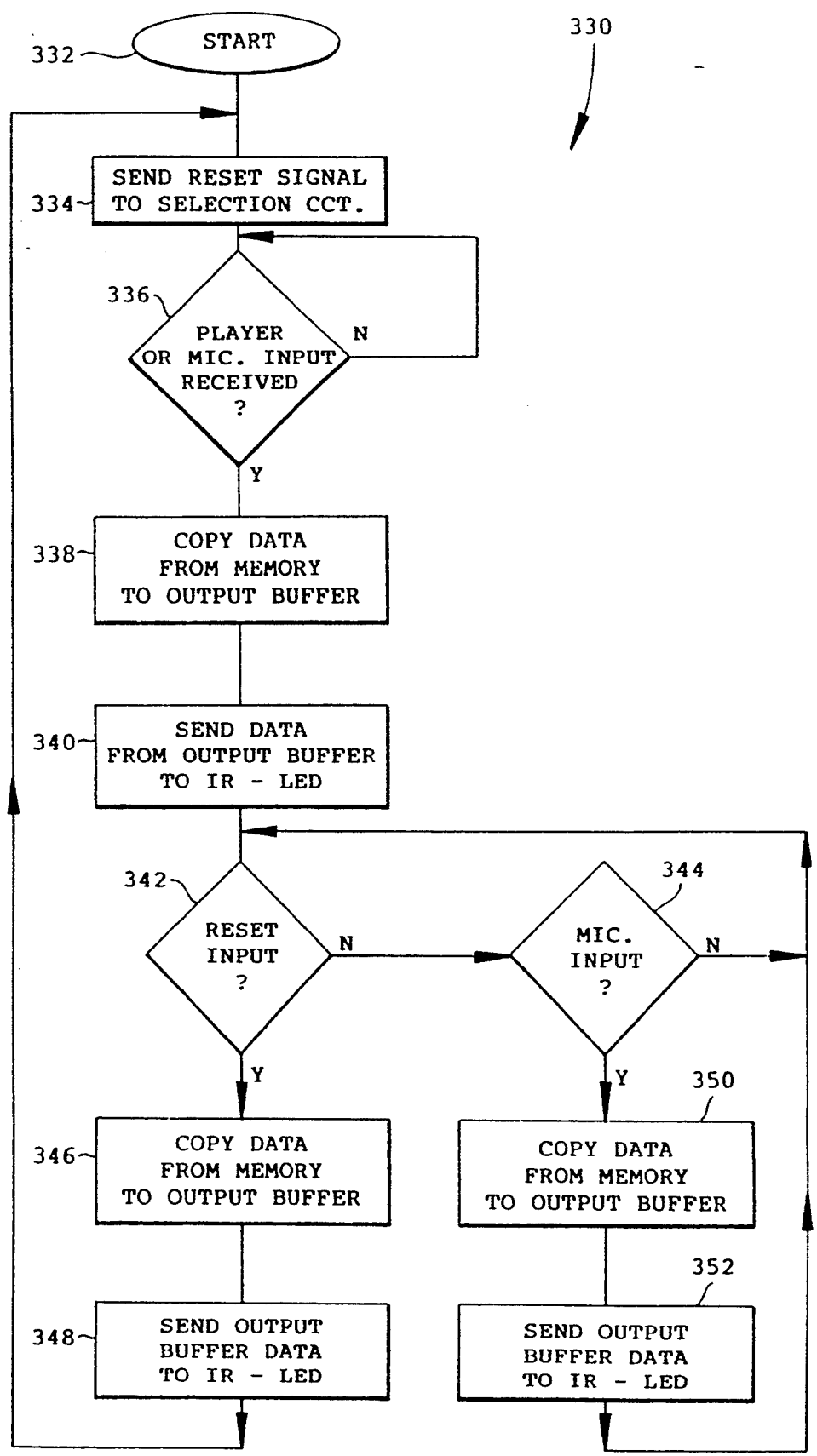
FIG. 10 is a flowchart of operation of the central processing unit of FIG. 7, whilst in a playing mode.

Operation of the embodiment of the game apparatus 2 illustrated in FIG. 7 is coordinated by the central processing unit 172, which may be controlled via software code stored permanently in the non-volatile memory 168. FIGS. 9 and 10 show examples of operational flow charts which illustrate the sequence of operations carried out by the program controlled central processing unit 172 during programming and playing modes respectively.

In FIG. 9 there is shown flowchart 300 is carried out when the program/play switch input 153 of the game apparatus 2 places the central processing unit (CPU) 172 into the program mode. Beginning at step 301, at step 302 the CPU examines input 169 from the selection circuitry 156 and reset input 170. Following actuation of one of these inputs the CPU 172 then proceeds to examine input from the infrared photo diode 154 by way of the amplifier and threshold device 158 (steps 304 and 306). When an input from the photo diode 154 is received, the received and digitized data is stored in a first temporary buffer in the CPU 172 (step 308). The CPU then proceeds to again examine input from the photo-diode circuitry 154, 158 until a further input is received (steps 310 and 312). The second received and digitized data from the photo-diode is stored in a second temporary buffer in the CPU 172 (step 314) and the first and second buffers are then compared to determine coincidence (steps 316 and 318). If the data stored in the first and second buffers are coincident (step 322) the CPU 172 assumes that the remote control signal data has been received correctly on both occasions, and the signal data stored in the first temporary buffer is then transferred to non-volatile memory 168 for further reference. The location to which the buffer data is moved in non-volatile memory 168 is dependent upon whether a player or reset input was received at step 302. If the stored data in the first and second buffers is not coincident the CPU 172 must indicate failure of the programming procedure (step 320) such as by illuminating an indicator lamp. The procedure may then be repeated by returning to step 302.

FIG. 10 illustrates flow chart 330 which sets forth the sequence of events carried out by the central processing unit 172 under software control whilst the program/play switch input 153 indicates the play mode is operative. Beginning at step 332, at step 334 the central processing unit 172 issues a reset signal on line 169 to the selection circuitry 156 to reset the selection circuitry so as to be responsive to input from the player inputs 24. The central processing unit then waits until an input from either the selection circuitry 156 or the microphone input line 167 is received (step 336), at which time the procedure continues to step 338. Data is retrieved from the memory locations corresponding to the remote control signal stored is respect of the player inputs, and this data is copied from the memory to an output buffer in the central processing unit 172. The output buffer is of the type which has a serial output, whereby the data may be output from the buffer to the transistor 162 controlling the infrared light emitting diode 164 in the form of a pulse train (step 340). The central processing unit 172 then examines the reset input 170 (step 342) and if no input is received the microphone input line 167 is examined at step 344. If a microphone input is also not received the procedure returns to step 342 to examine the reset input 170 once again. If a reset input is received at step 342 data from the memory 168 corresponding to the reset function is retrieved and copied into the output buffer of the central processing unit 172 (step 346). The contents of the output buffer are then sent in serial fashion to the output controlling the base of transistor 162, so as modulate the light output of infrared light emitting diode 164. The procedure thereafter returns to step 334 to reset the selection circuitry 156. If a microphone input is received at step 344, data is retrieved from the memory 168 corresponding to the remote control signal stored in respect of the player inputs 24 (ie the pause function) and this data is copied into the output buffer of the central processing unit 172. The output buffer data is serially issued to the transistor 162 so as to modulate the infrared light emitting diode, whereby the remote control signal is transmitted to the video playback apparatus 3 (steps 350 and 352). Following this transmission the procedure returns to step 342 to await an input on the reset input line 170.

Figure 4:
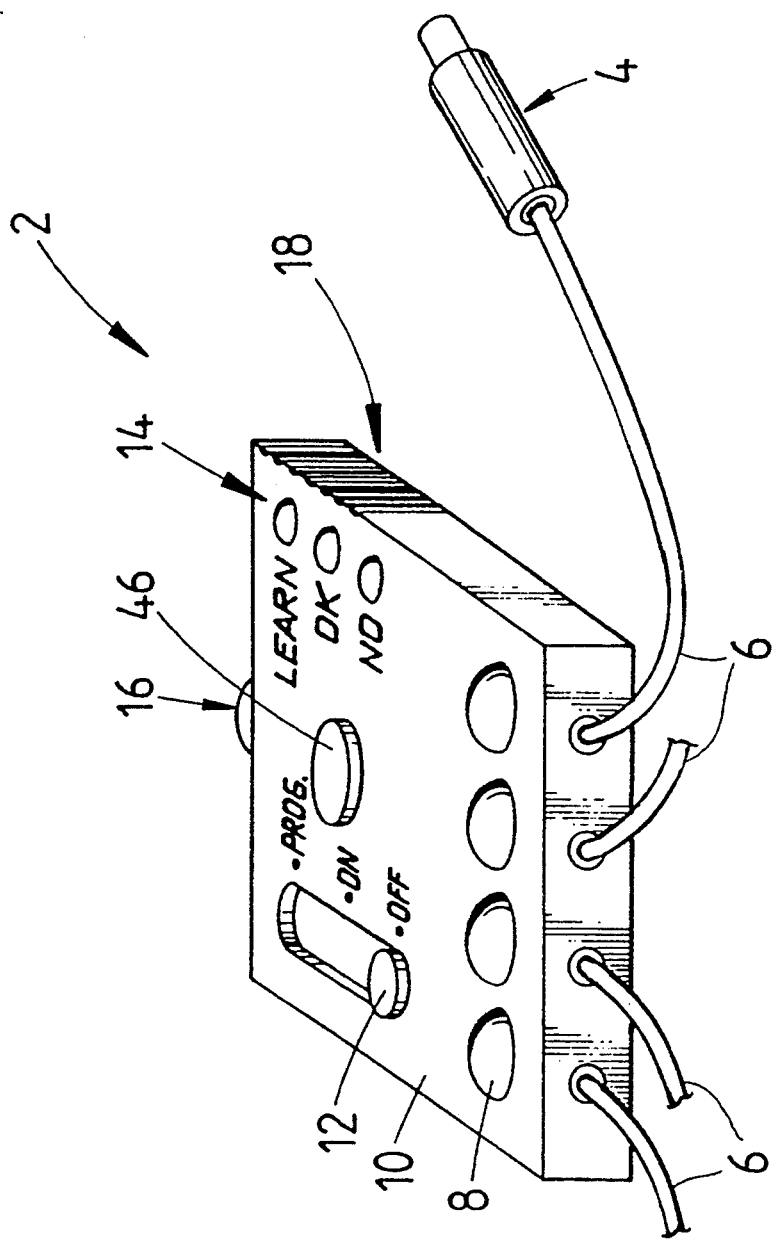
FIG. 4 is an illustrative diagram showing the way in which the embodiments of FIGS. 1 and 2 may be practically implemented.

FIG. 4 illustrates a partial perspective view of the game apparatus 2 in the form in which it may be supplied. The circuitry of the game apparatus is enclosed in a game case 10, from which extends a plurality of switch cords 6, one of which is shown terminating in a player switch 4 which constitutes the player input 24 described above. Indicator lamps 8 are shown corresponding to each switch cord 6. A three position switch 12 is also provided, one position rendering the apparatus in an off state, another position placing the apparatus in play mode, and a final position for the programming mode of the game apparatus 2. A remote control signal output 16 housing the infrared light emitting diode is provided at the front of the game case 10, which in use should be directed toward the VCR 20 such that signals issued from the remote control signal output 16 may be received by the VCR 20. Three indicator lights 14 are also provided, one being labelled "learn" and indicating when the apparatus is in the program or "learning" mode, a second light labelled "OK" indicating when a received remote control signal has been properly received, demodulated and stored in memory, and a third light ladled "No" indicating failure of the programming procedure (see step 320 of flowchart 300). A window or aperture 18 which is transparent to infrared radiation is provided on one side of the game case 10, behind which is provided the infrared photo-diode 154 for receiving remote control signal whilst the game apparatus is in the programming mode. Finally, a reset button 46 is provided, which provides reset input 170.

Many modifications to the apparatus described in detail hereinbefore are envisaged as remaining within the scope of the present invention. For example, the VCR 20 may be substituted by a remotely controllable laser disc or video compact disc, or comprise any suitable of video playback device, so long as it is controllable remotely by a game apparatus 2. Consequently, the pre recorded video information, which has until now been described as provided on a video cassette 21, may naturally be provided on a format suitable to be replayed by the particular type of video playback device which is employed. Furthermore, the video playback device which is employed is not required to be controllable by way of infrared remote control signals as described above, as many other types of remote control are also known and envisaged as remaining within the scope of the present invention, including control by ultrasonic signals, or by way of a remote control cord connecting the video playback apparatus 3 and game apparatus 2 directly. The construction of the game apparatus 2 may therefore be varied in accordance with the type of video playback apparatus 3 with which it is designed to be used in conjunction with. For example, in the case of an ultrasonically controlled video playback apparatus 3, the infrared photo diode 154 of the game apparatus 2 described in relation to FIG. 7 would be substituted with an ultrasonic sensor and demodulator, whilst the infrared light emitting diode 164 and controlling transistor 162 would be substituted with an ultrasonic transducer and controllable modulator.

Alternatively, the game apparatus may be used in conjunction with an audio reproduction device, such as an audio compact disk player which is controllable remotely. In this event the questions and answers would be pre-recorded in an audio format. Similarly the game apparatus may be used together with a remotely controllable television, without a playback device such as a VCR at all. In this case a special television broadcast may be required to transmit the questions and answers to the television for reproduction. The function which is controllable remotely may therefore comprise a "mute" function which halts the audio output of the television, and a pause may be provided in the broadcast after each question to allow players to answer the question. Instead of a microphone input to the game apparatus, there may be a light sensitive input which, when actuated, causes the television to recommence audio output. If such a light sensitive input is provided, the television broadcast may include a particular visual signal immediately preceding each answer during the broadcast, so that the light sensitive input is able to identify the visual signal to cause the television to recommence audio output before the answer is broadcast.

The foregoing detailed description of the apparatus of the invention is intended to be illustrative only and not for the purposes of limitation. It will be understood that the apparatus is susceptible to various alternative embodiments and modifications other than those described without departing from the spirit and scope of the invention as claimed.

What is claimed is:

1. A game apparatus for use with video and/or audio reproduction apparatus having at least one function of video or audio reproduction which is controllable remotely by way of remote control signals, said game apparatus comprising control means for issuing a first said remote control signal and a plurality of switch means coupled to said control means by way of selection means, wherein when one of said switch means is actuated said selection means causes said control means to issue said first remote control signal, and thereafter said selection means prevents the actuation of any of said switch means from causing the issuance of a said remote control signal until said game apparatus has been reset, the control means being programmable to issue different remote control signals corresponding to different reproduction apparatus.

2. The game apparatus as claimed in claim 1, wherein the function of the reproduction apparatus controlled by way of said first remote control signal comprises a mute function which mutes audio reproduction output.

3. The game apparatus as claimed in claim 1, wherein said reproduction apparatus includes a video playback device for reproducing prerecorded visual information, such that the function of the reproduction apparatus controlled by way of said first remote control signal comprises a pause function which pauses reproduction of said prerecorded visual information.

4. The game apparatus as claimed in claim 1, wherein the reproduction apparatus is responsive to said first remote control signal to suspend the issuance of video and/or audio information therefrom, and wherein said control means issues a second remote control signal in response to said game apparatus being reset so as to cause the reproduction apparatus to recommence issuance of the video and/or audio information.

5. The game apparatus as claimed in claim 4, further comprising a reset switch operable by a user of the game apparatus to cause said game apparatus to be reset.

6. The game apparatus as claimed in claim 4, wherein said game apparatus further comprises timer means for issuing a reset signal to reset the game apparatus after a predetermined interval from the issuance of said first remote control signal.

7. The game apparatus as claimed in claim 4, further comprising means responsive to a visual or auditory signal from said reproduction apparatus so as to cause said game apparatus to be reset.

8. The game apparatus as claimed in claim 4, wherein the reproduction apparatus comprises a television, and wherein said first remote control signal acts to mute audio output from the television, the game apparatus further comprising means responsive to a visual signal from said television so as to cause the control means to issue said second remote control signal.

9. The game apparatus as claimed in claim 1, wherein the format of said remote control signals is obtained from a remote control device which may be used to control the reproduction apparatus during normal operation, the format of said remote control signals being obtained by the control means by receiving and demodulating the remote control signals from the remote control device, whereby said game apparatus is programmed to operate with a different reproduction apparatus by obtaining and storing the remote control signals of a remote control device corresponding to said different reproduction apparatus.

10. A video game apparatus for use with a video playback device capable of supplying prerecorded visual information to a video display device for display thereon, said video playback device having at least a pause function controllable remotely by way of remote signals, said video game apparatus comprising remote control means for issuing a first said remote signal and a plurality of switch means coupled to said remote control means by way of selection means, wherein when one of said switch means is actuated said selection means causes said remote control means to issue said first remote signal, and thereafter said selection means prevents the actuation of any of said switch means from causing the issuance of a said remote signal until said apparatus has been reset, the control means being programmable to issue different remote control signals corresponding to different video playback devices.

11. The video game apparatus as claimed in claim 10, wherein the format of said remote signals is obtained from a remote control device which may be used to control the video playback device during normal operation, the format of said remote signals being obtained by the remote control means of the video game apparatus by receiving and demodulating the remote signals from the remote control device, whereby said video game apparatus may be programmed to operate with a different video playback device by obtaining and storing the remote signals of a remote control device corresponding to said different playback device.

12. The video game apparatus as claimed in claim 10, wherein said game apparatus is reset by way of a reset switch operable by a user of the game apparatus.

13. The video game apparatus as claimed in claim 10, wherein said game apparatus further comprises timer means for issuing a reset signal to reset the game apparatus after a predetermined interval from the issuance of said first remote signals.

14. The video game apparatus as claimed in claim 10, wherein said apparatus further comprises means responsive to visual or auditory signals issued, in use, by said video playback device to cause said game apparatus to reset.

15. The video game apparatus as claimed in claim 10, wherein said video playback device or said video display device includes audio reproduction means, said apparatus further comprising a means responsive to an audio signal issued by said audio reproduction means to cause said remote control means to issue a said remote signal.

16. The video game apparatus as claimed in claim 10, wherein the operation of resetting said apparatus either causes said remote control means to issue said first remote signal or causes said remote control means to issue a second remote signal.

17. The video game apparatus as claimed in claim 16, wherein when said video playback device receives said first remote signal the supply of said prerecorded information is paused, and if the supply of said video information by said video playback device is paused the receipt of said first remote signal or said second remote signal by said video playback device causes the video playback device to recommence said supply.

18. A video game apparatus for use with a video playback device capable of supplying prerecorded visual and audio information to a video and audio reproduction means, said video playback device having a plurality of functions which are controllable remotely by a plurality of infrared control signals, said game apparatus comprising:

control means for issuing at least one of said infrared control signals;

a plurality of switch means which are actuable by users of the apparatus; and a selection means coupled between the switch means and the control means;

wherein following actuation of one of said plurality of switch means said selection means causes said control means to issue a said infrared control signal to pause supply of said prerecorded information and thereafter prevents the actuation of any of said switch means from causing the issuance of a said infrared control signal until said selection means receives a reset signal.

19. The video game apparatus as claimed in claim 18, further including a medium prerecorded with video and audio information suitable for reproduction by way of said video playback device, and means responsive to visual and/or audio signals reproduced from said prerecorded video and audio information to cause said control means to issue a said infrared control signal.

20. The video game apparatus of claim 18, further comprising an audio visual storage medium prerecorded with a sequence of questions and answers for reproduction by means of said video playback device and said video and audio reproduction means.

21. A video game apparatus for use with an audio visual reproduction means having a plurality of functions which are controllable remotely by a plurality of remote control signals, the game apparatus comprising:

a control means for issuing said remote control signals;

a plurality of switch means actuable by users of the apparatus to output a first control signal to the control means;

a reset switch actuable to output a second control signal to the control means; and means responsive to a visual or auditory signal from the audiovisual reproduction means to output a third control signal to the control means; wherein the control means is responsive to the first and/or third control signals to issue a first remote control signal operative to cause the audio visual reproduction means to pause reproduction of audio and/or visual information and responsive to the second and/or third control signals to issue a second remove control signal operative to cause the audiovisual reproduction means to recommence reproduction of the audio and/or visual information.

22. A video game apparatus comprising:

an audio visual reproduction means provided with prerecorded visual and audio information for reproduction thereof and having a plurality of functions which are controllable remotely by remote control signals;

control means for issuing said remote control signals;
a plurality of switch means actuable by users of the apparatus; and
a selection means coupled between the switch means and the control means;
wherein following actuation of one of said plurality of switch means said selection means causes said control means to issue a said remote control signal to pause reproduction of the prerecorded audio and/or visual information and thereafter prevents the actuation of any of said switch means from causing the issuance of a said remote control signal until said selection means receives a reset signal, the apparatus further comprising means responsive to auditory and/or visual signals from the reproduction means to cause the control means to issue a said remote control signal operative to pause and/or recommence reproduction of the prerecorded audio and/or visual information.

* * * * *

UNITED STATES PATENT AND TRADEMARK OFFICE
CERTIFICATE OF CORRECTION

PATENT NO. : 5,364,108
DATED : November 15, 1994
INVENTOR(S) : Philip S. Esnouf

It is certified that error appears in the above-indentified patent and that said Letters Patent is hereby corrected as shown below:

On title page, item, [30] Foreign Application Priority Data, please correct:

"Apr. 10, 1992 [AU]   Australia .................. 1842/92"  to

— Apr. 10, 1992 [AU]   Australia .................. PL1842/92 —.

Signed and Sealed this

Thirty-first Day of January, 1995

Attest:

BRUCE LEHMAN

*Attesting Officer*          *Commissioner of Patents and Trademarks*